(12) United States Patent
Hayashida et al.

(10) Patent No.: US 7,323,515 B2
(45) Date of Patent: Jan. 29, 2008

(54) SEALING COMPOSITION AND SEALS MADE BY USING THE SAME

(75) Inventors: Kazunori Hayashida, Sayama (JP); Takehisa Kida, Izumisano (JP); Kazutoshi Yamamoto, Yamatokoriyama (JP); Tomotaka Nakagawa, Kashiwara (JP); Takahiro Yamagishi, Tokushima (JP); Masanobu Kato, Tokushima (JP)

(73) Assignees: Jtekt Corporation, Osaka (JP); Koyo Sealing Techno Co., Ltd., Tokushima (JP)

( * ) Notice: Subject to any disclaimer, the term of this patent is extended or adjusted under 35 U.S.C. 154(b) by 209 days.

(21) Appl. No.: 10/497,035

(22) PCT Filed: Nov. 29, 2002

(86) PCT No.: PCT/JP02/12478

§ 371 (c)(1),
(2), (4) Date: Nov. 2, 2004

(87) PCT Pub. No.: WO03/046105

PCT Pub. Date: Jun. 5, 2003

(65) Prior Publication Data

US 2005/0054753 A1 Mar. 10, 2005

(30) Foreign Application Priority Data

Nov. 30, 2001 (JP) .............................. 2001-365895

(51) Int. Cl.
*C08L 27/12* (2006.01)
*C08L 79/08* (2006.01)

(52) U.S. Cl. ................... 525/180; 525/181; 525/184
(58) Field of Classification Search ................ 525/180, 525/181, 184
See application file for complete search history.

(56) References Cited

U.S. PATENT DOCUMENTS 6,642,300 B1  11/2003  Kawaguchi et al.

FOREIGN PATENT DOCUMENTS

| JP | 54-57568 | 5/1979 |
|----|----------|--------|
| JP | 55-108485 | 8/1980 |
| JP | 5-171132 | 7/1993 |
| JP | 6-49438 | 2/1994 |
| JP | 10-139970 | 5/1998 |
| JP | 2000-119468 | 4/2000 |
| JP | 2000-309704 | 11/2000 |

*Primary Examiner*—Ana L. Woodward
(74) *Attorney, Agent, or Firm*—Rabin & Berdo, PC

(57) ABSTRACT

The invention relates to a sealing composition which comprises a crosslinkable fluoroelastomer, a crosslinking agent for this elastomer and a reinforcing polyimide resin powder; and seals such as O-rings, made by molding the composition into a prescribed shape and crosslinking the molded article. According to the invention, seals free from metals and sulfur can be made from a fluoroelastomer suitable for the production unit for semiconductor devices without a scatter of physical properties within one seal or among seals, and the obtained seals are lowered in the compression set determined ate the same hardness level to cause little permanent set by compression in use, thus having a prolonged service life.

15 Claims, No Drawings

SEALING COMPOSITION AND SEALS MADE BY USING THE SAME

TECHNICAL FIELD

The present invention relates to a sealing composition as a material for forming seals such as O-rings, and to seals formed by using the same.

BACKGROUND ART

In manufacturing systems used for manufacturing semiconductor devices, for example, a vacuum apparatus employs seals such as O-rings for maintaining a chamber thereof at a given degree of vacuum, or the vacuum apparatus or another apparatus employs the seals for sealing an atmosphere in the chamber thereof off from the outside.

Preferred as such a seal is one which is made by molding a sealing composition into a prescribed shape and subjecting the molded article to a crosslinking reaction, the sealing composition comprising a polyallyl compound and an organic peroxide, as a crosslinking agent, and a fluoroelastomer capable of being crosslinked using the crosslinking agent.

By virtue of the properties of fluoroelastomer, the aforesaid seal exhibits high heat resistance when used in a manufacturing apparatus wherein an operating temperature is raised to above 200° C. Furthermore, the seal is also excellent in resistances to particular atmospheres in the manufacturing apparatus, such as low temperature plasma and etching gases. In addition, both of the fluoroelastomer and the crosslinking agent that form the seal are free from metals constituting a causative factor of the contamination of semiconductor devices and from sulfur which may deteriorate the nature of conductor circuits.

Accordingly, the aforesaid seal is suited for use as a sealing material in the apparatuses for manufacturing the semiconductor devices or the like.

The sealing composition as the material of the seal is admixed with a reinforcing material for controlling the hardness of the seal.

As the reinforcing material, fluorine resin powders have been commonly used, which are free from metals and sulfur and have good heat resistance (see, for example, Japanese Patent Publication No. JP-2937302-B).

However, the fluorine resin powders have low ability to serve as the reinforcing material. In order to control the hardness of the seal to a predetermined hardness level, therefore, the fluorine resin powder need be admixed to the sealing composition in an increased packaging percentage (wt % based on the overall weight of the composition including the crosslinking agent and such).

As for an example of a combination of a fluoroelastomer and a fluorine resin powder to be described hereinlater in a comparative example, the combination requires such a large amount of fluorine resin powder as 80 parts by weight based on 100 parts by weight of fluoroelastomer (packing percentage of 43.1 wt %) to be admixed in order to achieve Type-A durometer hardness of at least 70 A as determined in accordance with JIS K6253$_{-1993}$ "Hardness Testing Method for Vulcanized Rubber" (equivalent to ISO 7619$_{-1986}$).

However, it is impracticable to uniformly disperse such a large amount of fluorine resin powder in the sealing composition and hence, a fear exists that the fluorine resin powder may be unevenly dispersed. In the event of the unevenly dispersed resin powder, the physical properties of seals formed from the sealing composition containing unevenly dispersed resin powder are varied in one seal or among two or more seals.

Furthermore, because of the high content of fluorine resin powder, the resultant seals suffer such a large compression set percentage that the seals are susceptible to permanent set associated with compression in use. Consequently, the seals detrimentally have short service lives.

DISCLOSURE OF THE INVENTION

It is an object of the invention to provide a novel sealing composition adapted for formation of seals suited for use in apparatuses for manufacturing semiconductor devices and the like, based on a fluoroelastomer, and free from metals and sulfur, the composition ensuring a predetermined hardness and having the following abilities:

a) to form seals which is less susceptible to permanent set associated with compression in use and thus achieves a prolonged service life, because the seals have a smaller compression set percentage than the conventional seals, and b) to eliminate variations of the physical properties in one seal or among two or more seals thereby to form seals all having consistent physical properties.

It is another object of the invention to provide seals formed using the aforesaid sealing composition and excellent in the aforementioned properties.

The sealing composition according to the invention comprises a crosslinkable fluoroelastomer, a crosslinking agent for crosslinking the fluoroelastomer, and a polyimide resin powder as a reinforcing material.

The resin constituting the reinforcing material in the sealing composition of the invention, and the resin collectively referred to as polyimide resin containing an imide group as a repeating structural unit in the molecule generally has such a high heat resistance as indicated by a heat resistance temperature of 200° C. or more. Furthermore, the polyimide resin is also excellent in resistances to a variety of particular atmospheres, such as low temperature plasma and etching gases, which may potentially occur in the manufacturing apparatuses for semiconductor devices. What is more, the polyimide resin does not contain such elements as metals and sulfur in the molecule.

According to the inventive sealing composition containing the polyimide resin powder as the reinforcing material, therefore, there may be formed seals suited for use in the manufacturing apparatuses for semiconductor devices and the like.

The polyimide resin powder has good affinity with the fluoroelastomer and besides, has a higher effect to reinforce the fluoroelastomer than the fluorine resin powder.

According to the invention, therefore, what is needed to form the seals having the prescribed hardness is to add the polyimide resin powder in a smaller amount than the fluorine resin powder. As for an example of a combination of a fluoroelastomer and a polyimide resin powder to be described hereinlater in an example of the invention, such a small amount as 20 parts by weight of polyimide resin powder based on 100 parts by weight of fluoroelastomer (packing percentage of 15.9 wt %) only need be added to achieve the aforesaid Type-A durometer hardness of at least 70 A.

It is easy to uniformly disperse such a small amount of polyimide resin powder in the sealing composition. Therefore, it is ensured that seals all having consistent physical properties are formed without encountering variations of the physical properties in one seal or among two or more seals.

In correspondence to the decrease in the amount of polyimide resin powder, the compression set percentage based on the same hardness level may be reduced from that of the conventional seals. Thus, there may be formed seals less susceptible to permanent set associated with compression in use and extended in the service life.

Since the seals according to the invention are characterized by molding the aforesaid sealing composition of the invention and crosslinking the molded articles, the seals are excellent in the aforementioned properties.

BEST MODES FOR CARRYING OUT THE INVENTION

The invention will be described as below.

[Sealing Composition]

As mentioned supra, a sealing composition of the invention comprises a crosslinkable fluoroelastomer, a crosslinking agent for crosslinking the fluoroelastomer, and a polyimide resin powder as a reinforcing material.

(Polyimide Resin Powder)

As the polyimide resin powder, there may be used any of the powders of various resins collectively referred to as polyimide resin and containing an imide group as a repeating structural unit in the molecule, as described above.

Specifically, usable as the polyimide resin powder is a powder comprising at least one selected from the group consisting of full-aromatic polyimide resins, thermoplastic polyimide resins, thermosetting bismaleimide-type polyimide resins, and thermosetting aromatic polyimide resins which are classified into the individual categories according to structures of the other portions than the imide group and different properties deriving from the structures.

Above all, the powders of thermoplastic polyimide resins may preferably be used from the view point of ease of production and availability.

In the light of obtaining a higher reinforcing effect by using a smaller amount of resin powder and of preventing the seal from being so increased in the compression set percentage as to become susceptible to permanent set associated with compression in use, the polyimide resin powder may preferably have a particle size of 100 μm or less, or more preferably of 10 μm or less in terms of average particle diameter. It is noted, however, that a resin powder having too small a particle size is difficult to produce. Furthermore, such a small resin powder involves a fear that the powder is prone to form aggregation such that it may not be easy to uniformly disperse the resin powder in the sealing composition. Therefore, the polyimide resin powder may preferably have an average particle diameter of at least 1 μm, or more preferably of at least 3 μm.

The packing percentage of the polyimide resin powder may preferably be in the range of 1 to 35 wt %.

If the packing percentage of the resin powder is less than 1 wt %, the addition of the polyimide resin powder fails to offer a sufficient reinforcing effect. This leads to a fear that seals having a required hardness may not be formed. Conversely, in a case where the packing percentage of the resin powder exceeds 35 wt %, the resultant seals may be too hard. In addition, the seals have an excessive compression set percentage such that the seals are more susceptible to permanent set associated with compression in use.

In the light of forming the seals which have a more suitable hardness as a sealing material and which are less prone to permanent set associated with compression in use, the polyimide resin powder may be used in a particularly preferred packing percentage of 10 to 35 wt % out of the aforementioned range.

(Fluoroelastomer)

As the fluoroelastomer, there may be used any of various fluorine-containing elastomers which, as described above, are excellent in heat resistance and resistances to the particular atmospheres, free from metals and sulfur, and crosslinkable.

Examples of such a fluoroelastomer include, but not limited to, a dipolymer or terpolymer made by copolymerizing: at least one selected from a first group consisting of tetrafluoroethylene (TFE), fluorovinylidene (VDF) and ethylene (E) which form a main chain of the elastomer; and at least one selected from a second group consisting of hexafluoropropylene (HFP), perfluoroalkyl vinyl ether (PFVE, specifically exemplified by perfluoromethyl vinyl ether and the like) and propylene (P) which are used for introducing a crosslinking point to the main chain [provided that a dipolymer of ethylene (E) and propylene (P), both of which are free from fluorine, is excluded).

More specific examples of the usable fluoroelatomer include a dipolymer of VDF and HFP, a dipolymer of TFE and PFVE, a dipolymer of TFE and P, a terpolymer of VDF, TFE and HFP, a terpolymer of VDF, TFE and PFVE, a terpolymer of VDF, TFE and P, a terpolymer of E, TFE and PFVE, and the like.

Furthermore, a dipolymer or multi-copolymer of any of the above components and another fluorine-containing monomer, a mixture of two or more of these copolymers and the like are also usable as the fluoroelastomer.

Above all, the terpolymer of VDF, TFE and PFVE is particularly preferably used because of the following reasons. This terpolymer is free from metals and sulfur and can be crosslinked using a crosslinking agent comprising a combination of a polyallyl compound and an organic peroxide. Furthermore, the terpolymer is excellent in mixing/dispersing performance for the polyimide resin powder, less costly, and superior in low temperature properties.

The aforementioned dipolymer or terpolymer may be formed by actually copolymerizing the illustrative monomers of the first and second groups. Otherwise, a structure substantially equivalent to the aforesaid dipolymer or terpolymer may be formed by subjecting a previously formed main chain to a post-process for introducing a side chain thereinto.

(Crosslinking Agent)

As mentioned supra, a polyallyl compound and an organic peroxide are used in combination as the crosslinking agent for crosslinking the aforesaid fluoroelastomer. Such a combination-type crosslinking agent has an advantage of being free from metals and sulfur, as described above, and also an advantage of providing for the formation of seals having an even higher hardness.

Examples of a preferred polyallyl compound include: triallyl isocyanurate, triallyl cyanurate, triallyl trimellitate, diallylphthalate and the like. Above all, triallyl isocyanurate is particularly preferred.

Examples of a preferred organic peroxide include: diacyl peroxides such benzoyl peroxide, p-chlorobenzoyl peroxide, and bis(2,4-dichlorobenzoyl)peroxide; dialykyl peroxides such as di-α-cumyl peroxide, 2,5-dimethyl-2,5-bis(t-butylperoxy)hexane, 2,5-dimethyl-2,5-bis(t-butylperoxy)-3-hexyn, 1,3-bis[(t-butyldioxy)isopropylbenzene], 1,4-bis-[(t-butyloxy)isopropylbenzene], di-t-butyl peroxide, t-butyl-α- cumyl peroxide, and the like; alkyl peresters such as 2,5-dimethyl-2,5-bis(benzoylperoxy)hexane, t-butylperoxybenzoate, and the like; peroxyketals such as 1,1-bis(t-butylperoxy)-3,5,5-trimethyl cyclohexane; peroxycarbonates such as OO-t-butyl-O-isopropyl peroxycarbonate; and the like. Particularly preferred are the dialkyl peroxides and alkyl peresters.

Of the crosslinking agents, a mixing ratio of the polyallylic compound may preferably be in the range of 2 to 10 parts by weight or more preferably of 3 to 7 parts by weight based on 100 parts by weight of fluoroelastomer. On the other hand, a mixing ratio of the organic peroxide may preferably be in the range of 0.5 to 5 parts by weight or more preferably of 1 to 3 parts by weight based on 100 parts by weight of fluoroelatomer.

(Other Components)

In addition to the aforesaid components, the sealing composition of the invention may further be admixed with a processing aid agent, as required, such as a softener, plasticizer and tackifier.

A liquid fluorinated rubber is preferred as the processing aid agent from the standpoint of forming the seal which is particularly excellent in the heat resistance and resistances to the aforesaid particular atmospheres and is free from metals and sulfur. A usable liquid fluorinated rubber is exemplified by one which comprises a similar dipolymer or terpolymer to those mentioned above and which exhibits a viscosity on the order of 500 to 3000 cps at 100° C.

Any other reinforcing material or filling material may be used in combination with the polyimide resin powder so long as such a material does not impair the effects of the invention.

Resin powders may be preferred as the other reinforcing and filling materials. Examples of a usable resin powder include polyester resin powders such as of polyethylene terephthalate (PET) and polybutylene terephthalate (PBT); polycarbonate (PC) powders; fluorine resin powders; polyether etherketone (PEEK) powders; polyphenylene sulfide (PPS) powders; polyamide-imide (PAI) powders; polybenzoimidazole (PBI) powders; full-aromatic polyamide (aramid) powders; and the like.

Above all, the fluorine resin powders are preferred in the light of forming the seals which are excellent in the heat resistance and resistances to the aforementioned particular atmospheres and which are free from metals and sulfur. The preferred fluorine resin powders are formed from fluorine resins such as polytetrafluoroethylene (PTFE), a tetrafluoroethylene-hexafluoropropylene copolymer (FEP), a tetrafluoroethylene-perfuloroalkylvinylether copolymer (PFA), an ethylene-tetrafluoroethylene copolymer (ETFE), an ethylene-chlorotrifluoroethylene copolymer (ECTFE), polyvinylidene fluoride (PVDF) and polyvinyl fluoride (PVF).

The sealing composition of the invention may be supplied in various forms which include:

A) a form of mixture prepared by dry blending the aforementioned components in predetermined mixing ratios;
B) a form of uncrosslinked rubber compound obtained by the steps of kneading the dry blended mixture at temperatures lower than a crosslinking temperature by means of a hermetic kneader such as roll mill, Banbury mixer, intermix or pressure kneader, and then forming the kneaded product into sheet or the like; and
C) a form of uncrosslinked rubber compound obtained by the steps of kneading the dry blended mixture in an extruder at temperatures lower than the crosslinking temperature and then extruding the kneaded product.

[Seal]

The seal of the invention may be made by forming the aforesaid sealing composition into a predetermined shape and subjecting the formed product to a crosslinking reaction by heating.

The crosslinking reaction may be carried out in 1-step heating process or by a multi-step heating process wherein two or more heating steps are performed at different temperatures.

Specific examples of the seal include O-rings, square rings, squeeze packing, seal packing and the like.

The seals may preferably have a hardness of at least 70 A in terms of Type-A durometer hardness such as to be suited for use as a sealing material in the apparatuses for manufacturing semiconductor devices and the like. To serve this purpose, the polyimide resin powder may preferably be admixed in an amount of at least 20 parts by weight based on 100 parts by weight of fluoroelastomer, as described above.

Although an upper limit for the Type-A durometer hardness of the seal is not particularly limited, an excessively high hardness will lead to the following drawbacks. That is, the excessively hard seal is rather unsuited for use as a sealing material in the apparatuses for manufacturing semiconductor devices and the like. Furthermore, such a seal requires a large amount of polyimide resin powder to be admixed and hence, the seal has such a high compression set percentage as to be prone to permanent set associated with compression in use.

Therefore, it is more preferred that the Type-A durometer hardness of the seal is up to 90.

As described above, the seals of the invention may preferably be used in the apparatuses for manufacturing semiconductor devices and the like.

Examples of such a manufacturing apparatus include thin-film forming apparatuses (sputtering apparatuses, CVD apparatuses, vacuum deposition apparatuses, ion plating apparatuses); epitaxial growth apparatuses; oxidizing apparatuses (thermal oxidation apparatuses, plasma anodic oxidation apparatuses); doping apparatuses (laser doping apparatuses, plasma doping apparatuses, ion doping apparatuses, thermal diffusion apparatuses); annealing apparatuses (laser anneal apparatuses, electron-beam anneal apparatuses, infrared anneal apparatuses, electric oven anneal apparatuses); resist processing apparatuses (coating apparatuses, developing apparatuses, baking apparatuses, resist peeling apparatuses); exposure apparatuses (X-ray exposure apparatuses, light exposure apparatuses, SR exposure apparatuses, electron-beam exposure apparatuses, double-side exposure apparatuses); etching apparatuses (wet etching apparatuses, dry etching apparatuses); cleaning/drying apparatuses (wet cleaning apparatuses, dry cleaning apparatuses, drying apparatuses); detecting apparatuses (testing apparatuses, handling apparatuses, laser repair apparatuses, aging apparatuses, reliability testing apparatuses); and the like.

EXAMPLES

The invention will hereinbelow be described by way of reference to examples and comparative examples thereof.

Example 1

100 parts by weight of terpolymer of VDF, TFE and PFVE [commercially available as DAIEL (trademark) LT-302 from DAIKIN INDUSTRIES, Ltd.], as a crosslinkable fluoroelastomer; 4 parts by weight of triallyl isocyanurate (TAIC) as a polyallyl compound; 1.5 parts by weight of di-t-butyl peroxide (DBPO) as an organic peroxide; and 20 parts by weight of polyimide (PI) resin powder having an average particle diameter of 6 μm as a reinforcing material were blended together and kneaded by a roll mill thereby to form a sheet-like uncrosslinked rubber compound. The polyimide resin powder was prepared by pulverizing a thermoplastic polyimide resin [commercially available AURUM (trademark) from Mitsui Chemicals, Inc.]. The uncrosslinked rubber compound contained the polyimide resin powder in a packing percentage of 15.9 wt %. The mixing ratios of the above components are listed in Table 1 as below.

TABLE 1

| Component | Parts by weight |
| --- | --- |
| Fluoroelastomer | 100 |
| TAIC | 4 |
| DBPO | 1.5 |
| PI power (6 μm) | 20 |

Example 2

A sheet-like uncrosslinked rubber compound was prepared the same manner as in Example 1, except that the polyimide resin powder (average particle diameter: 6 μm) was admixed in a mixing ratio of 50 parts by weight. The uncrosslinked rubber compound contained the polyimide resin powder in a packing percentage of 32.2 wt %. The mixing ratios of the components are listed in Table 2 as below.

TABLE 2

| Component | Parts by weight |
| --- | --- |
| Fluoroelastomer | 100 |
| TAIC | 4 |
| DBPO | 1.5 |
| PI power (6 μm) | 50 |

Example 3

A sheet-like uncrosslinked rubber compound was prepared the same manner as in Example 1, except that a polyimide resin powder having an average particle diameter of 50 μm was used as the reinforcing material in an amount of 20 parts by weight. Similarly to the foregoing examples, the polyimide resin powder was prepared by pulverizing the thermoplastic polyimide resin [commercially available as AURUM (trademark) from Mitsui Chemicals, Inc.]. The uncrosslinked rubber compound contained the polyimide resin powder in a packing percentage of 15.9 wt %. The mixing ratios of the components are listed in Table 3 as below.

TABLE 3

| Component | Parts by weight |
| --- | --- |
| Fluoroelastomer | 100 |
| TAIC | 4 |
| DBPO | 1.5 |
| PI power (50 μm) | 20 |

Example 4

A sheet-like uncrosslinked rubber compound was prepared the same manner as in Example 3, except that the polyimide resin powder (average particle diameter: 50 μm) was admixed in a mixing ratio of 50 parts by weight. The uncrosslinked rubber compound contained the polyimide resin powder in a packing percentage of 32.2 wt %. The mixing ratios of the components are listed in Table 4 as below.

TABLE 4

| Component | Parts by weight |
| --- | --- |
| Fluoroelastomer | 100 |
| TAIC | 4 |
| DBPO | 1.5 |
| PI power (50 μm) | 50 |

Comparative Example 1

A sheet-like uncrosslinked rubber compound was prepared the same manner as in Example 1, except that the polyimide resin powder was not admixed. The mixing ratios of the components are listed in Table 5 as below.

TABLE 5

| Component | Parts by weight |
| --- | --- |
| Fluoroelastomer | 100 |
| TAIC | 4 |
| DBPO | 1.5 |

Comparative Example 2

A sheet-like uncrosslinked rubber compound was prepared the same manner as in Example 1, except that 20 parts by weight of fluorine resin power [commercially available as product name of TLP10F-1 from DuPont-Mitsui Fluorochemical Co. Ltd.] having an average particle diameter of 3 μm was used in place of the polyimide resin powder. The uncrosslinked rubber compound contained the fluorine resin powder in a packing percentage of 15.9 wt %. The mixing ratios of the components are listed in Table 6 as below.

TABLE 6

| Component | Parts by weight |
| --- | --- |
| Fluoroelastomer | 100 |
| TAIC | 4 |
| DBPO | 1.5 |
| Fluorine resin powder (3 μm) | 20 |

Comparative Example 3

A sheet-like uncrosslinked rubber compound was prepared the same manner as in Comparative Example 2, except that the fluorine resin power [commercially available as product name of TLP10F-1 from DuPont-Mitsui Fluorochemical Co. Ltd., and having an average particle diameter of 3 μm] was used in a mixing ratio of 50 parts by weight. The uncrosslinked rubber compound contained the fluorine resin powder in a packing percentage of 32.2 wt %. The mixing ratios of the components are listed in Table 7 as below.

TABLE 7

| Component | Parts by weight |
| --- | --- |
| Fluoroelastomer | 100 |
| TAIC | 4 |
| DBPO | 1.5 |
| Fluorine resin powder (3 μm) | 50 |

Comparative Example 4

A sheet-like uncrosslinked rubber compound was prepared the same manner as in Comparative Example 2, except that the fluorine resin power [commercially available as product name of TLP10F-1 from DuPont-Mitsui Fluorochemical Co.Ltd., and having an average particle diameter of 3 μm] was used in a mixing ratio of 80 parts by weight. The uncrosslinked rubber compound contained the fluorine resin powder in a packing percentage of 43.1 wt %. The mixing ratios of the components are listed in Table 8 as below.

TABLE 8

| Component | Parts by weight |
| --- | --- |
| Fluoroelastomer | 100 |
| TAIC | 4 |
| DBPO | 1.5 |
| Fluorine resin powder (3 μm) | 80 |

The following tests were conducted to evaluate the properties of the sheet-like uncrosslinked rubber compounds prepared in the above examples and comparative examples.

[Ordinary State Physical Properties Tests]

(Hardness Test)

Each of the sheet-like uncrosslinked rubber compounds was heated under pressure by means of a heat press so as to undergo a crosslinking reaction, and thereafter, was heated in a normal oven so as to be secondarily crosslinked. Thus were prepared test specimens having a thickness of 20 mm. The heat press was operated at 160° C. for 10 minutes. The secondary crosslinking reaction was carried out at 200° C. for 4 hours.

The above test specimens were determined for the Type-A durometer hardness in accordance with the test procedure set forth in JIS K6253$_{-1993}$ "Hardness Testing Method for Vulcanized Rubber".

(Tensile Test)

Each of the sheet-like uncrosslinked rubber compounds was heated under pressure by means of a heat press so as to undergo a crosslinking reaction. Subsequently, the resultant rubber compound was punched into a shape of a #3 dumbbell specimen specified by JIS K6251$_{-1993}$ "Tensile Testing Method for Vulcanized Rubber" (equivalent to ISO 37$_{-1977}$). Thus were obtained test specimens having a thickness of 2 mm. The heat press was operated under the same conditions as the above. Each of the specimens was marked with a line for elongation measurement at breakage.

The specimens were determined for the tensile strength (MPa) and the elongation at broken (%) in accordance with the above test procedure set forth in the JIS K6251$_{-1993}$.

(Compression Set Test)

Each of the sheet-like uncrosslinked rubber compounds was filled in a mold and heated under pressure by means of a heat press so as to undergo a crosslinking reaction. Subsequently, the molded article was heated in a normal oven so as to be secondarily crosslinked. Thus were obtained specimens for compression set test specified by JIS K6262$_{-1993}$ "Permanent set Testing Method for Vulcanized Rubber" (equivalent to ISO 815$_{-1972}$ and ISO 2285$_{-1988}$). The specimens had thicknesses of 12.5±0.3 mm, diameters of 29.0±0.5 mm, and a shape of right circular cylinder. The heat press was operated at 160° C. for 15 minutes. The secondary crosslinking reaction was carried out at 200° C. for 4 hours.

The specimens were determined for the compression set percentage (%) in accordance with the test procedure set forth in the JIS K6262$_{-1993}$.

The test was conducted under the conditions: compression rate of 25%, test temperature of 175° C., and test time of 22 hours.

(Quantitative Analysis of Metal Elements)

Sheet-like specimens were prepared by crosslinking the sheet-like uncrosslinked rubber compounds by means of the heat press operated under the same conditions as in the hardness test. Each of the specimens was loaded in an instrument for simultaneous thermogravimetry/differential thermal analysis measurements [commercially available from SHIMADZU CORP.] wherein the specimen was quantitatively analyzed for metal contents (wt %) as being thermally decomposed. Heat elevating conditions for the thermal decomposition were a starting temperature of 30° C., heat elevation rate at 30° C./min, and an ultimate temperature of 1000° C. Under the above heat elevating conditions, $N_2$ purge was carried out in a temperature range of 30-750° C. whereas $O_2$ purge was carried out in a temperature range of 750-1000° C.

[Heat Aged Test I]

The same specimens for hardness test and tensile test as those used in the aforementioned ordinary state physical properties test were aged with hot air under the conditions of temperature of 230° C. and test time of 24 hours in accordance with a test tube method specified by JIS K6257$_{-1993}$ "Accelerated Aging Testing Method for Vulcanized Rubber" (equivalent to ISO 188$_{-1982}$) Subsequently, the resultant specimens were subjected to the hardness test and the tensile test under the same conditions.

The amount $\Delta H_A$ of variation of Type-A durometer hardness of each specimen as determined by the hardness test before and after the heat aged process was calculated using the following equation:

$$\Delta H_A = \Delta H_{A1} - \Delta H_{A0}$$

In the equation, $\Delta H_{A0}$ denotes the Type-A durometer hardness (A) in the ordinary state physical properties test, namely prior to the heat aged process, whereas $\Delta H_{A1}$ denotes the Type-A durometer hardness (A) after the heat aged process.

The variation percentage $\Delta T_B$ (%) of tensile strength of each specimen as determined by the tensile test before and after the heat aged process was calculated using the following equation:

$$\Delta T_B = \frac{T_{B1} - T_{B0}}{T_{B0}} \times 100$$

In the equation, $T_{B0}$ denotes the tensile strength (MPa) in the ordinary state physical properties test, namely before the heat aged process, whereas $T_{B1}$ denotes the tensile strength (MPa) after the heat aged process.

In addition, the variation percentage $\Delta E_B$ (%) of elongation at broken of each specimen as determined by the tensile test before and after the heat aged process was calculated using the following equation:

$$\Delta E_B = \frac{E_{B1} - E_{B0}}{E_{B0}} \times 100$$

In the equation, $E_{B0}$ denotes the elongation at broken (%) in the original physical properties test, namely before the heat aged process, whereas $E_{B1}$ denotes the elongation at broken (%) after the heat aged process.

[Heat Aged Test II]

The specimens were determined for the amount $\Delta H_A$ of variation of Type-A durometer hardness, the variation percentage $\Delta T_B$ (%) of tensile strength and the variation percentage $\Delta E_B$ (%) of elongation at broken the same way as in the Heat Aged Test I, except that the heat aged process was performed under the conditions of 230° C. and 70 hours.

The results of the above tests are listed in Tables 9 and 10 as below.

TABLE 9

|  |  | Ex. 1 | Ex. 2 | Ex. 3 | Ex. 4 |
|---|---|---|---|---|---|
| Parts by weight | Fluoroelastomer | 100 | 100 | 100 | 100 |
|  | TAIC | 4 | 4 | 4 | 4 |
|  | DBPO | 1.5 | 1.5 | 1.5 | 1.5 |
|  | PI powder (6 μm) | 20 | 50 | — | — |
|  | PI powder (50 μm) | — | — | 20 | 50 |
| Ordinary state physical properties tests | A durometer hardness (A) | 70 | 81 | 71 | 85 |
|  | Tensile strength (MPa) | 9.9 | 7 | 11.5 | 6.5 |
|  | Elongation at Broken (%) | 380 | 210 | 200 | 190 |
|  | Compression set percentage (%) | 13 | 15 | 15 | 16 |
|  | Metal content (wt %) | <1 | <1 | <1 | <1 |
| Heat aged tests I | ΔHA | 1 | 2 | 1 | 1 |
|  | ΔTB | 2 | 5 | 1 | 2 |
|  | ΔEB | −5 | −3 | −2 | −2 |
| Heat aged tests II | ΔHA | 0 | 2 | 1 | 0 |
|  | ΔTB | −3 | 1 | 0 | −2 |
|  | ΔEB | −2 | 1 | −4 | 0 |

TABLE 10

|  |  | Ex. 1 | Ex. 2 | Ex. 3 | Ex. 4 |
|---|---|---|---|---|---|
| Parts by weight | Fluoroelastomer | 100 | 100 | 100 | 100 |
|  | TAIC | 4 | 4 | 4 | 4 |
|  | DBPO | 1.5 | 1.5 | 1.5 | 1.5 |
|  | Fluorine resin powder (3 μm) | — | 20 | 50 | 80 |
| Ordinary state physical properties tests | A durometer hardness (A) | 53 | 60 | 67 | 72 |
|  | Tensile strength (MPa) | 5.7 | 13 | 13.1 | 12.7 |
|  | Elongation at Broken (%) | 300 | 450 | 440 | 440 |
|  | Compression set percentage (%) | 13 | 12 | 14 | 18 |
|  | Metal content (wt %) | <1 | <1 | <1 | <1 |
| Heat aged tests I | ΔHA | 1 | 1 | 1 | 2 |
|  | ΔTB | 1 | 0 | −4 | 0 |
|  | ΔEB | 15 | 4 | 8 | 6 |
| Heat aged tests II | ΔHA | 2 | 2 | 3 | 4 |
|  | ΔTB | 66 | −10 | 2 | −10 |
|  | ΔEB | 54 | 7 | 22 | 6 |

As apparent from the tables, the uncrosslinked rubber compound of Comparative Example 1, which is admixed with no reinforcing material, has a low post-crosslinked hardness. Furthermore, Heat Aged Test II shows that this rubber compound is significantly increased in the tensile strength and the elongation.

As indicated by Comparative Example 4 out of the system including Comparative Examples 2 to 4 employing the fluorine resin powder as the reinforcing material, the fluorine resin powder need be added in such a large amount as 80 parts by weight based on 100 parts by weight of fluoroelastomer (in terms of packing percentage of 43.1 wt %) in order to achieve the post-crosslinked hardness of at least 70 A. The article formed by molding and crosslinking the uncrosslinked rubber compound of Comparative Example 4 admixed with such a large amount of fluorine resin powder has a high compression set percentage of 18%. In a case where the uncrosslinked rubber compound of Comparative Example 4 is used to form seals, therefore, all the seals so formed are susceptible to permanent set associated with compression in use, thus having short service lives.

In the rubber compounds of Comparative Examples 2 and 3 which are admixed with smaller amounts of fluorine resin powder than the above, the post-crosslinking hardnesses are still low although not so low as that of Comparative Example 1.

It is thus confirmed that the fluorine resin powder has an insufficient effect to reinforce the fluoroelastomer.

In contrast, all the articles made by molding and crosslinking the uncrosslinked rubber compounds of Examples 1 to 4 employing the polyimide resin powder as the reinforcing material achieve hardnesses of 70 A or more but have low compression set percentages of 16% or less. It is thus confirmed that in a case where the uncrosslinked rubber compounds of these examples are used to form seals, all the seals so formed are less susceptible to permanent set associated with compression in use, thus achieving prolonged service lives.

The articles made by molding and crosslinking the rubber compounds of these examples encounter very little change in the physical properties thereof in both of Heat Aged Tests I and II. It is thus confirmed that these articles have excellent heat resistance and the like. Furthermore, these articles have metal contents of less than 1 wt %. That is, these articles involve no fear of contaminating semiconductor devices and the like and hence, are suited for use as a sealing material in apparatuses for manufacturing semiconductor devices and the like.

The invention claimed is:

1. A sealing composition, consisting of:
   a crosslinkable fluoroelastomer;
   a crosslinking agent for crosslinking the fluoroelastomer; and
   a polyimide resin powder as a reinforcing material.

2. The sealing composition according to claim 1, wherein the polyimide resin powder has a mean particle size of 100 µm or less.

3. The sealing composition according to claim 1, wherein the polyimide resin powder is added in a packing percentage in weight percent based on the total weight of constituents ranging from 1 to 35 wt %.

4. The sealing composition according to claim 1, wherein the fluoroelastomer is a terpolymer of fluorovinylidene, tetrafluoroethylene and perfluoroalkyl vinyl ether.

5. The sealing composition according to claim 1, wherein the crosslinking agent is comprised of a polyallyl compound and an organic peroxide in combination.

6. The seal formed by molding the sealing composition according to claim 5, and subjecting the molded article to a crosslinking reaction.

7. The seal according to claim 6, having a Type-A durometer hardness of at least 70 A.

8. A seal provided by a process comprising:
   providing a sealing composition consisting of a crosslinkable fluoroelastomer, a crosslinking agent for crosslinking the fluoroelastomer, and a polyimide resin powder as a reinforcing material;
   molding the sealing composition to provide a molded article; and
   subjecting the molded article to a crosslinking reaction to provide the seal.

9. The seal according to claim 8, having a Type-A durometer hardness of at least 70 A.

10. The seal according to claim 8, wherein the polyimide resin powder has a mean particle size of 100 µm or less.

11. The seal according to claim 10, having a Type-A durometer hardness of at least 70 A.

12. The seal according to claim 6, wherein the polyimide resin powder is added in a packing percentage ranging from 1 to 35 wt %.

13. The seal according to claim 12, having a Type-A durometer hardness of at least 70 A.

14. The seal according to claim 8, wherein the fluoroelastomer is a terpolymer of fluorovinylidene, tetrafluoroethylene and perfluoroalkyl vinyl ether.

15. The seal according to claim 14, having a Type-A durometer hardness of at least 70 A.

* * * * *